June 13, 1950  D. E. RICHARDSON  2,511,177
APPARATUS FOR MEASURING THE COMPOSITION OF A GAS
Filed July 14, 1945
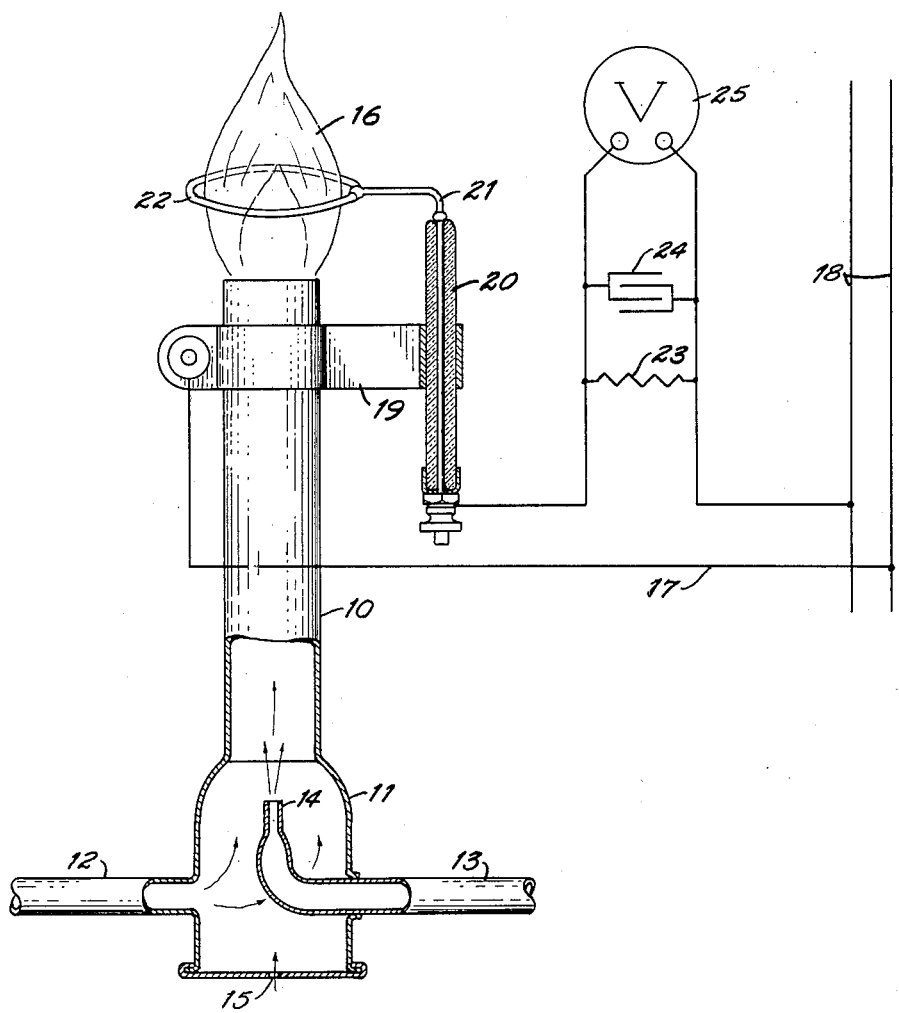
Inventor
DONALD E. RICHARDSON
by Dawson Ooms & Booth
Attorneys Patented June 13, 1950

2,511,177

UNITED STATES PATENT OFFICE

2,511,177

APPARATUS FOR MEASURING THE COMPOSITION OF A GAS

Donald E. Richardson, Chicago, Ill., assignor to Republic Flow Meters Company, Chicago, Ill., a corporation of Illinois Application July 14, 1945, Serial No. 605,138

3 Claims. (Cl. 23—255)

This invention relates to apparatus for measuring the composition of gas and more particularly to continuous measurement of the oxygen content of a combusted gas.

One of the primary concerns in analyzing combusted gases such as flue gas or exhaust gas from an internal combustion engine is a determination of the percentage of free oxygen in the gas. Gases of this type have heretofore been anlyzed by methods based on volumetric absorption of the component gases and while this method is successful for determining $CO_2$ content, the apparatus required to determine directly the percentage of oxygen is cumbersome and difficult to operate. Furthermore, in apparatus of this type readings must be based on samples periodically taken so that it is impossible to obtain a continuous and instantaneous indication.

One of the objects of the present invention is to provide apparatus for measuring the composition of gas in which an immediate and continuous indication of the composition is obtained.

Another object of the invention is to provide apparatus for measuring the composition of gas in which the percentage of oxygen is directly indicated.

Still another object is to provide apparatus in which the composition of a gas is measured by measuring the conductivity of a flame resulting from combustion of a mixture of the gas with a combustible gas. According to an important feature of the invention the flame conductivity is measured by a circuit including the gas burner and a contact adjacent to but spaced from the flame.

The above and other objects and advantages of the invention will be more readily apparent from the following description when read in connection with the accompanying drawing, in which the single figure is a diagrammatic view with parts in section of an apparatus embodying the invention.

The present invention is based on the principle that conductivity of a flame varies with the percentage of free oxygen in the gas producing the flame. It is known that flames have a rectifying action on alternating electric current and I have found that by passing a current through a flame to which the gas to be tested is supplied and measuring the current, the percentage of free oxygen can readily be determined.

To carry this principle into effect an apparatus is employ comprising a burner tube 10 enlarged at its lower end as indicated at 11 to form a mixing chamber and having a conduit 12 leading into its lower portion to supply the gas to be tested. A fuel gas such as ordinary city gas, is supplied through a pipe 13 extending into the mixing chamber and terminating in an upwardly facing nozzle 14. Supply of the fuel gas and of the gas to be tested is proportioned by regulating the supply pressures or by other desired regulating means so that the percentages of the two gases in the total mixture will remain constant. If desired, a small amount of air may be added to the mixture by forming an orifice 15 in the lower part of the mixing chamber through which flow of air will be induced.

The mixture of gases burns at the upper end of the tube 10 in a flame 16 through which an electric current is passed. For this purpose, the burner tube is connected by a wire 17 to one side of an alternating current supply indicated at 18 and a contact insulated from the tube is mounted in conductive relationship to the flame. As shown, the contact is supported by a bracket 19 on the burner tube carrying an insulator 20 through which a wire 21 extends.

According to an important feature of the present invention, the contact is supported above the burner tube to lie adjacent but spaced from the flame. In the form shown the contact is an annular ring 22 carried by the wire 21 and of such a size that the flame 16 will pass through it but will not actually touch it.

This construction provides much more consistent and reliable results than structures in which the contact lies in the flame and apparently operates on a different electrical theory. When the contact is in the flame it is heated to a high temperature such that it becomes emissive. Electrons therefore flow from the contact to the cooler burner tube so that current will flow preferentially from the burner tube to the contact. It will be apparent that this arrangement is extremely sensitive to flame temperature and size changes and to location of the contact in the flame. In addition, the contact tends to be coated or corroded by the flame, making the results erratic.

With the present construction the contact remains relatively cool and is not subject to coating or corrosion. Current flow is apparently due to electrons in the flame and in the atmosphere immediately around the flame traveling from the burner tube toward the contact so that current will flow preferentially from the contact to the burner tube. I have found that current flow in this circuit is substantially proportional to variations in oxygen content of the sample gas and that consistent indications of oxygen content can be obtained directly from current measurements.

The wire 21 is connected to the other side of the alternating current source through a resistance 23 and a condenser 24 connected in parallel. Indications are obtained by a voltmeter 25 which may be calibrated to read directly in percentage of oxygen connected across the resistance and condenser.

In operation, the fuel gas and gas to be tested are supplied continuously and are burned in a flame as at 16. The alternating current supplied to the circuit is rectified by the flame so that only the rectified current flows through the circuit. The voltage drop across the resistance is measured by the voltmeter 25 and indicates directly and continuously the oxygen content of the gas to be tested. The condenser serves to average the half wave rectified voltage so that a constant D. C. output voltage is obtained proportional to the difference between the internal conductance of the flame in two directions which varies with the oxygen content of the flame.

When the oxygen content of the gas remains substantially constant for a relatively short period of time, the condenser reaches a steady state of charge which is determined by the average value of the rectified A. C. potential and the ratio of the load impedance to the difference between the internal conductance of the flame in two directions. A change in the oxygen content of the gas causes a change in the internal conductance of the flame and the condenser will be charged or discharged to a new steady state value. This occurs very rapidly since the internal conductance of the flame is very large compared with the load impedance. Thus, a very rapid and accurate indication of the percentage of oxygen in the gas is obtained and since the flow is continuous, continuous indication is provided.

While one embodiment of the invention has been shown and described in detail, it will be understood that this is illustrative only and is not intended as a definition of the scope of the invention, reference being had to the appended claims for this purpose.

This application is a continuation in part of my copending application Serial No. 478,469, filed March 8, 1943, now abandoned.

What is claimed is:

1. Apparatus for measuring the composition of a gas which comprises a burner having a mixing chamber and a burner orifice, means for conducting predetermined proportions of the gas and a fuel gas to the mixing chamber whereby they will mix and the mixture will burn at the orifice, an annular electric contact member spaced above the orifice to surround the flame therefrom, an electric circuit including the burner and the contact, and means in the circuit to measure a function of the current flow therein.

2. Apparatus for measuring the composition of a gas comprising a burner tube, means for conducting predetermined proportions of the gas and of a fuel gas to the tube adjacent one end to burn in a flame at the other end of the tube, an electric contact insulated from the tube and spaced above said other end thereof, said contact being spaced laterally from the axis of the tube to lie adjacent but out of physical contact with the flame, an electric circuit including the tube and the contact, and means to measure a function of the current in the circuit.

3. Apparatus for measuring the composition of a gas comprising means for mixing the gas with a combustible gas and burning the mixture in a flame, means forming an electrical conductor contacting the gas below the base of the flame, an electrical contact spaced from the conductor lying beside but out of physical engagement with the flame, an electric circuit including the contact and the conductor, and means to measure a function of the current in the circuit.

DONALD E. RICHARDSON.

REFERENCES CITED

The following references are of record in the file of this patent:

UNITED STATES PATENTS

| Number | Name | Date |
|---|---|---|
| 824,638 | De Forest | June 26, 1906 |
| 867,878 | De Forest | Oct. 8, 1907 |
| 2,127,977 | Lamb | Aug. 23, 1938 |
| 2,343,001 | Cohen | Feb. 29, 1944 |